United States Patent
Beichl et al.

(10) Patent No.: US 7,832,734 B2
(45) Date of Patent: Nov. 16, 2010

(54) SEAL SYSTEM

(75) Inventors: Stefan Beichl, Herrsching (DE); Alfons Gail, Friedberg (DE)

(73) Assignee: MTU Aero Engines GmbH, Munich (DE)

( * ) Notice: Subject to any disclaimer, the term of this patent is extended or adjusted under 35 U.S.C. 154(b) by 515 days.

(21) Appl. No.: 11/884,643

(22) PCT Filed: Feb. 8, 2006

(86) PCT No.: PCT/DE2006/000210

§ 371 (c)(1),
(2), (4) Date: Aug. 16, 2007

(87) PCT Pub. No.: WO2006/086946

PCT Pub. Date: Aug. 24, 2006

(65) Prior Publication Data

US 2008/0258403 A1    Oct. 23, 2008

(30) Foreign Application Priority Data

Feb. 16, 2005   (DE) .................. 10 2005 006 939

(51) Int. Cl.
*F01D 11/02*    (2006.01)
(52) U.S. Cl. .................. 277/355; 277/411; 415/174.2
(58) Field of Classification Search ............. 415/174.2, 415/174.3, 173.1, 173.3; 277/355, 421, 411, 277/301, 413
See application file for complete search history.

(56) References Cited

U.S. PATENT DOCUMENTS

| | | | | |
|---|---|---|---|---|
| 4,209,268 A | * | 6/1980 | Fujiwara et al. ............. | 405/147 |
| 5,106,104 A | * | 4/1992 | Atkinson et al. ............ | 277/303 |
| 5,265,412 A | | 11/1993 | Bagepalli et al. ........... | 60/39.32 |
| 5,568,931 A | * | 10/1996 | Tseng et al. ................ | 277/355 |
| 6,079,945 A | * | 6/2000 | Wolfe et al. ................ | 415/231 |
| 6,226,975 B1 | * | 5/2001 | Ingistov ...................... | 60/772 |
| 6,536,773 B2 | * | 3/2003 | Datta .......................... | 277/355 |
| 6,808,179 B1 | * | 10/2004 | Bhattacharyya et al. ..... | 277/348 |

(Continued)

FOREIGN PATENT DOCUMENTS

DE         103 26 540         1/2005

(Continued)

OTHER PUBLICATIONS

International Preliminary Examination Report RCT/DE2006/000210 (6 pages).

*Primary Examiner*—Shane Bomar
*Assistant Examiner*—Kipp C Wallace
(74) *Attorney, Agent, or Firm*—Davidson, Davidson & Kappel, LLC

(57) ABSTRACT

A seal arrangement for a turbo-engine, for sealing a peripheral gap between a rotor and a stator is provided. The stator a seal holder provided with at least one groove for respectively receiving a segmented, dynamic seal. Segments of the dynamic seal are made up of a plurality of brush seal segments, and free ends of bristles of the brush seal segments extend in the radial direction project from the respective groove and lie on the rotor. The or every groove for receiving the brush-type seal segments is designed without an undercut, the brush-type seal segments being received in the respective groove without an undercut in a positive manner.

14 Claims, 5 Drawing Sheets

U.S. PATENT DOCUMENTS

| | | | |
|---|---|---|---|
| 6,840,518 B2 * | 1/2005 | Boston | 277/355 |
| 7,165,771 B2 * | 1/2007 | Beichl et al. | 277/355 |
| 7,387,301 B2 * | 6/2008 | Rupp et al. | 277/355 |
| 7,445,212 B2 * | 11/2008 | Gail et al. | 277/355 |
| 2002/0189096 A1 * | 12/2002 | Flower | 29/888.3 |
| 2003/0131602 A1 | 7/2003 | Ingistov | 60/772 |
| 2004/0094900 A1 * | 5/2004 | Turnquist et al. | 277/355 |

FOREIGN PATENT DOCUMENTS

| | | |
|---|---|---|
| DE | 101 63 804 | 7/2007 |

\* cited by examiner

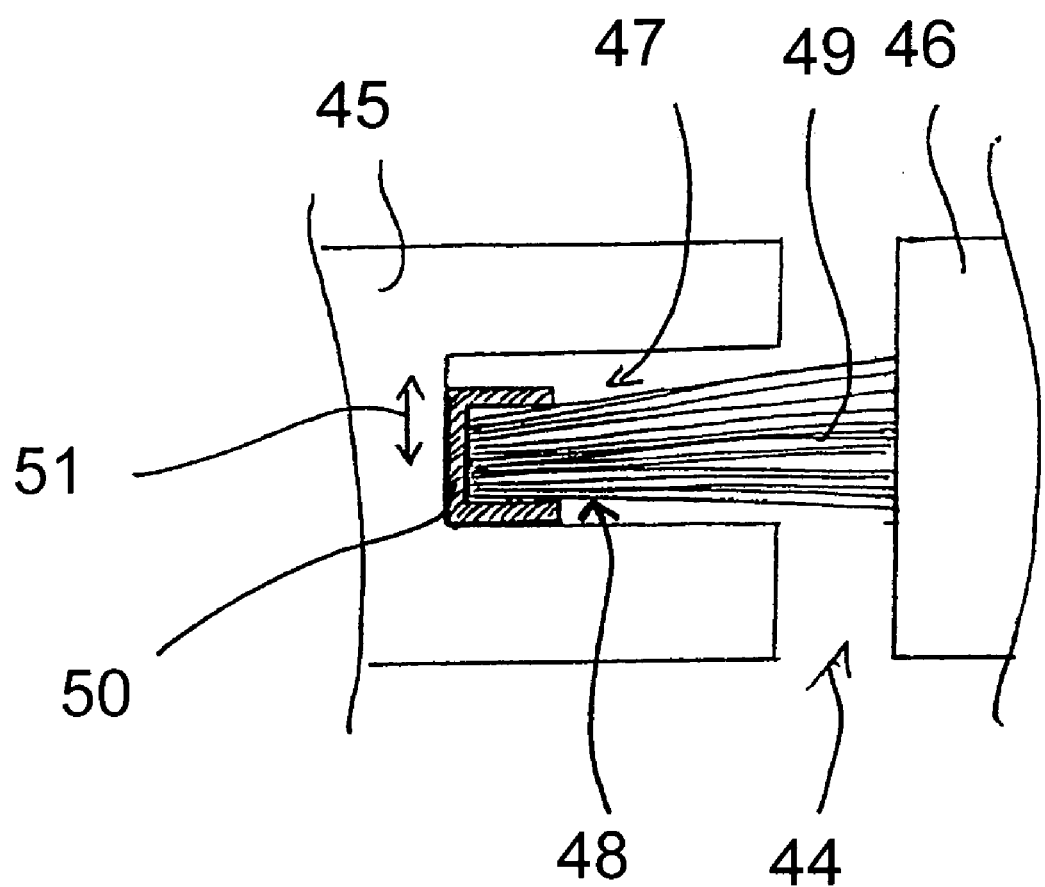
Fig. 9

SEAL SYSTEM

The present invention relates to a seal system for a turbo-engine for sealing a circumferential gap between a rotor and a stator and to a seal system for a turbo-engine for sealing a gap between two stator-side components. Furthermore, the present invention relates to a turbo-engine, a gas turbine, and a steam turbine.

BACKGROUND

Gas turbines are composed of multiple subassemblies such as at least one compressor, one combustion chamber, and at least one turbine. The or each compressor and the or each turbine have a rotor which rotates with respect to a stationary stator. The stator is, in particular, a stationary housing having associated stationary guide vanes. The rotor has associated rotor blades which rotate with the rotor with respect to the stationary guide vanes and the stationary housing.

To optimize the efficiency of gas turbines, leakage flows must be minimized. This applies, on the one hand, to leakage flows between components rotating relative to each other and, on the other hand, to leakage flows between stationary components. Seal systems for sealing a gap between components rotating relative to each other are referred to as dynamic seal systems. Seal systems for sealing a gap between stationary components are referred to as static seal systems.

Brush seals have been found satisfactory for sealing gaps between components rotating relative to each other or between stationary components. Brush seals have a plurality of wire-type bristles attached to a bristle holder. A groove is integrated into one of the components defining the gap to be sealed; the bristle holder is positioned in the groove from which free ends of the bristles project outward, these free ends of the bristles contacting another component defining the gap. To secure the brush seal in a groove, the groove has a so-called undercut, which constricts sections of the groove and positively secures the bristle holder of the brush seal in the groove. The manufacture of undercut grooves is technically complex and expensive and therefore disadvantageous overall.

SUMMARY OF THE INVENTION

On this basis, the object of the present invention is to provide a novel seal system.

The present invention provides a seal system for a turbo-engine for sealing a circumferential gap between a rotor and a stator, the stator having a seal holder having at least one circumferential groove for receiving a segmented dynamic seal, segments of the dynamic seal being designed as brush seal elements, and the free ends of the bristles of the brush seal segments extending in the radial direction projecting from the particular groove and resting on the rotor. According to the present invention, the or each groove for receiving brush seal segments is designed as a groove without undercut, the brush seal segments being positively secured in the particular groove without an undercut, preferably by at least one clamping element each.

According to the present invention, it is proposed that the groove for receiving the brush seal segments be designed without undercut. This reduces the manufacturing complexity for the grooves, so that the seal systems made of brush seals may be manufactured more cost-effectively overall.

According to an advantageous refinement of the present invention, the brush seal segments are caulked in the particular groove without undercut; for this purpose, a lip-shaped clamping element of the particular groove is bent in the direction of the brush seal segment to be caulked to constrict the particular groove and to positively secure the brush seal segment in the particular groove.

According to an advantageous refinement of the present invention, the brush seal segments are secured in the particular groove without undercut by pin-type or screw-type clamping elements passing through bore holes; at least one clamping element is positioned in the area of each brush seal segment, and the particular clamping element constricts the particular groove and positively secures the brush seal segment in the particular groove.

The present invention also provides a seal system for a turbo-engine for sealing a gap between two stator-side components, a first stator-side component having a seal holder having at least one groove for receiving a static seal, the static seal being designed as a brush seal, and the free ends of the bristles of the brush seal projecting from the particular groove and resting on the second stator-side component. According to the present invention, the or each groove for receiving the brush seal is designed as a groove without undercut, the brush seal being secured in the particular groove without undercut with a radial clearance.

BRIEF DESCRIPTION OF THE DRAWINGS

Exemplary embodiments of the present invention are explained in greater detail on the basis of the drawing without being limited thereto.

FIG. 9 shows a cross section through a seal system according to the present invention according to a ninth exemplary embodiment of the present invention;

The present invention is described below in greater detail with reference to FIGS. 1 through 9.

DETAILED DESCRIPTION

Figure 1:
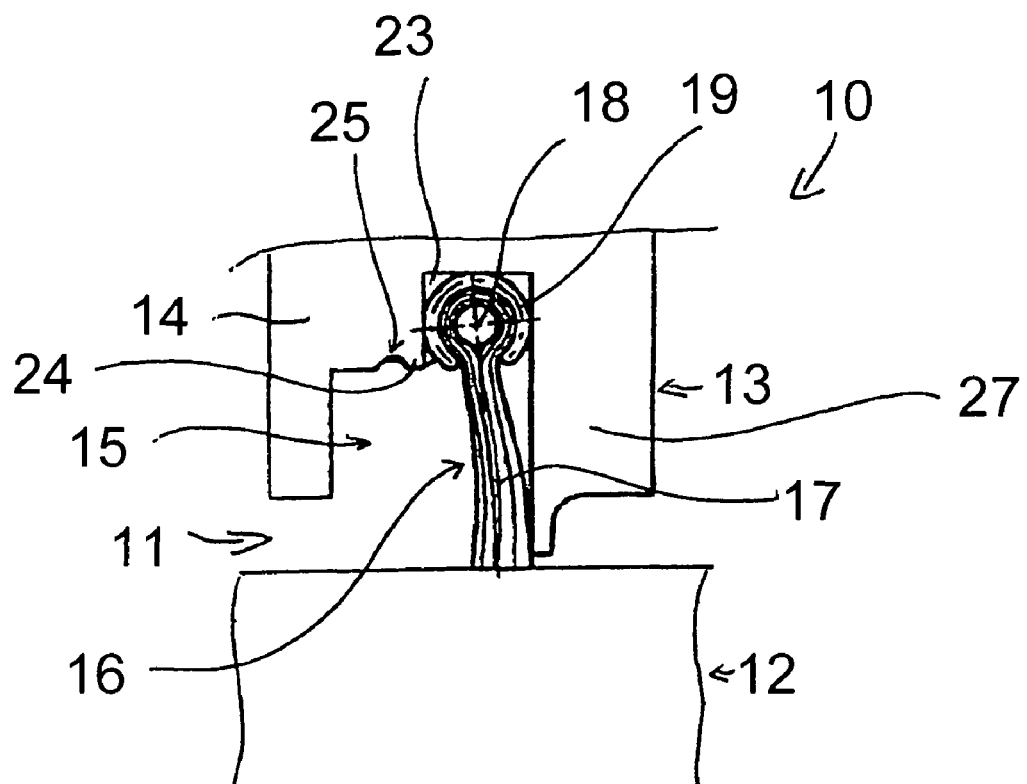
FIG. 1 shows a cross section through a seal system according to the present invention according to a first exemplary embodiment of the present invention.
Figure 2:
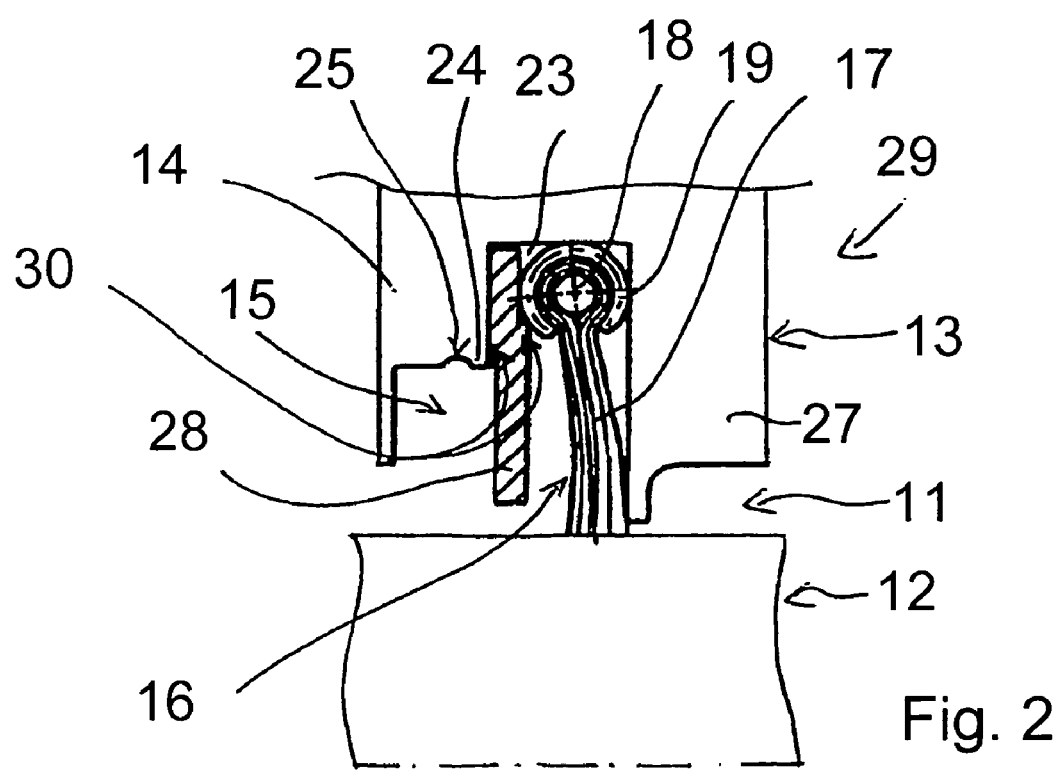
FIG. 2 shows a cross section through a seal system according to the present invention according to a second exemplary embodiment of the present invention.

FIG. 1 shows a seal system 10 for sealing a gap 11 between a rotor 12 and a stator 13. Therefore, seal system 10 is a dynamic seal system. Stator 13 is associated with a seal holder 14, a segmented brush seal made up of a plurality of brush seal segments 16 being situated in a groove 15 of seal holder 14. Groove 15 depicted in FIG. 1 is thus designed as a circumferential groove running in the circumferential direction around rotor 12, an equally circumferential brush seal being situated in the circumferential groove, and the brush seal being composed of a plurality of brush seal segments 16. Each brush seal segment 16 extends over a defined angular section of circumferential groove 15.

Figure 4:
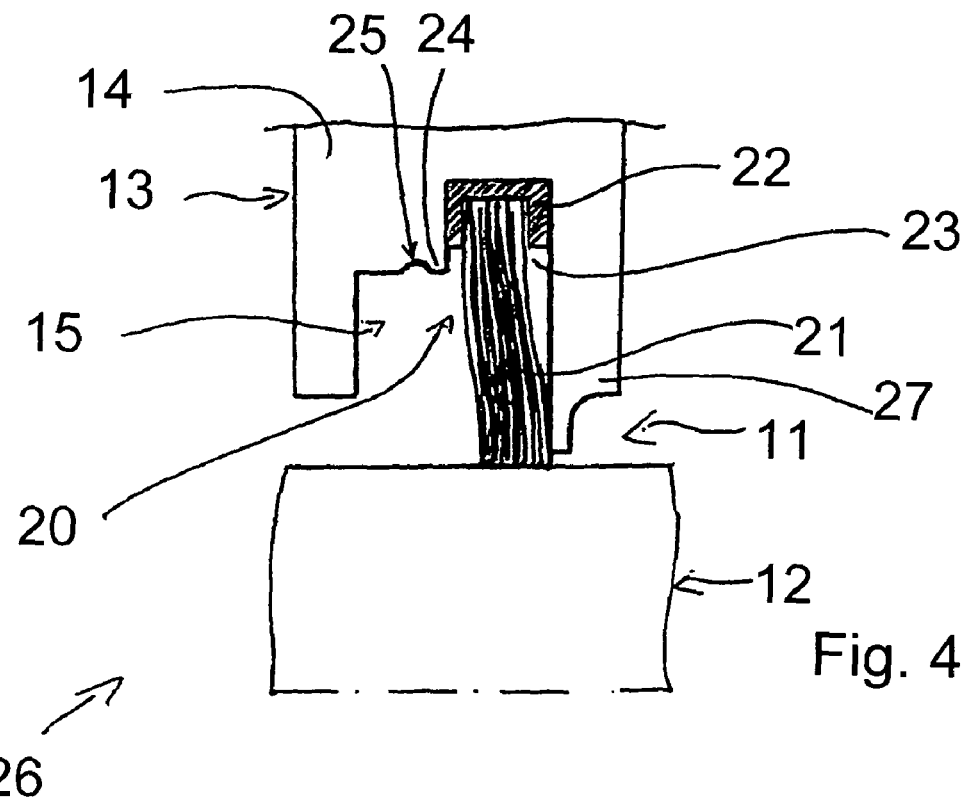
FIG. 4 shows a cross section through a seal system according to the present invention according to a fourth exemplary embodiment of the present invention.

In the exemplary embodiment shown in FIG. 1, brush seal segment 16 is formed by a plurality of wire-type bristles 17, which are wound around a wire-shaped bristle holder 18 and are secured on bristle holder 18 by a C-shaped fastening element 19. Bristles 17 extend in the radial direction, and their free ends rest on the rotor. Bristles 17 rest axially on the radially longer side of groove 15 which is used as a support surface for bristles 17. No separate support ring, which is normally required for brush seals, is needed. Although such an embodiment of brush seal segments 16 is preferred, there are, as FIG. 4 shows, also other conceivable embodiments of brush seal segments 20. In brush seal segment 20 depicted in FIG. 4, a plurality of wire-type bristles 21 is secured in a U-shaped bristle holder 22, namely preferably glued therein. According to the present invention, further variations of brush seal segments are also conceivable, for example, having bristles welded to a bristle holder.

According to the present invention, it is proposed that groove 15 for receiving brush seal segments 16 be designed without undercut. A receptacle section 23 of groove 15 without undercut therefore has the same axial width over the entire radial height. In this groove 15 without undercut, i.e., receptacle section 23 thereof without undercut, brush seal segment 16 is positively secured in the area of bristle holder 18, specifically with the aid of a clamping element.

In the exemplary embodiment of FIG. 1, brush seal segments 16 are secured in groove 15, i.e., in receptacle section 23 by a circumferential lip-shaped clamping element 24. Lip-shaped clamping element 24 is delimited, i.e., defined by a circumferential recess 25 in a groove wall of groove 15 and by receptacle section 23. By bending lip-shaped clamping element 24 in the direction of brush seal segment 16 to be secured in groove 15, receptacle section 23 of groove 15 may be constricted to thus positively secure brush seal segment 16 in groove 15.

In the exemplary embodiment of FIG. 1, brush seal segments 16 are then caulked in groove 15, i.e., in receptacle section 23 by bending lip-shaped clamping element 24. Lip-shaped circumferential clamping element 24 may be bent either over its entire circumference or only in some sections. The same holds true for seal system 26 of the exemplary embodiment of FIG. 4, which differs from seal system 10 of the exemplary embodiment of FIG. 1 only in the specific design of the brush seal segments.

In the exemplary embodiment of FIGS. 1 and 4, bristles 17 and 21, respectively, of brush seal segments 16 and 20, respectively, rest on a groove wall forming a support element 27. If a cover element 28 is also desired for the brush seal segments in addition to support element 27, seal system 29 according to FIG. 2 may be used. Seal system 29 of FIG. 2 differs from seal system 10 of FIG. 1 only in that receptacle section 23 for brush seal segments 16 is widened in the axial direction, so that in addition to brush seal segments 16, a disk-shaped element forming cover element 28 may be accommodated in receptacle section 23 together with brush seal segments 16. By bending lip-shaped clamping element 24, cover element 28, together with brush seal segments 16, are caulked in groove 15, i.e., in receptacle section 23 thereof. Joint caulking of cover element 28 and brush seal segment 16 is supported in that cover element 28 has a step-shaped shoulder 30 on both sides, i.e., on the one hand, on a side facing particular brush seal segment 16 and, on the other hand, on a side facing lip-shaped clamping element 24.

Figure 3:
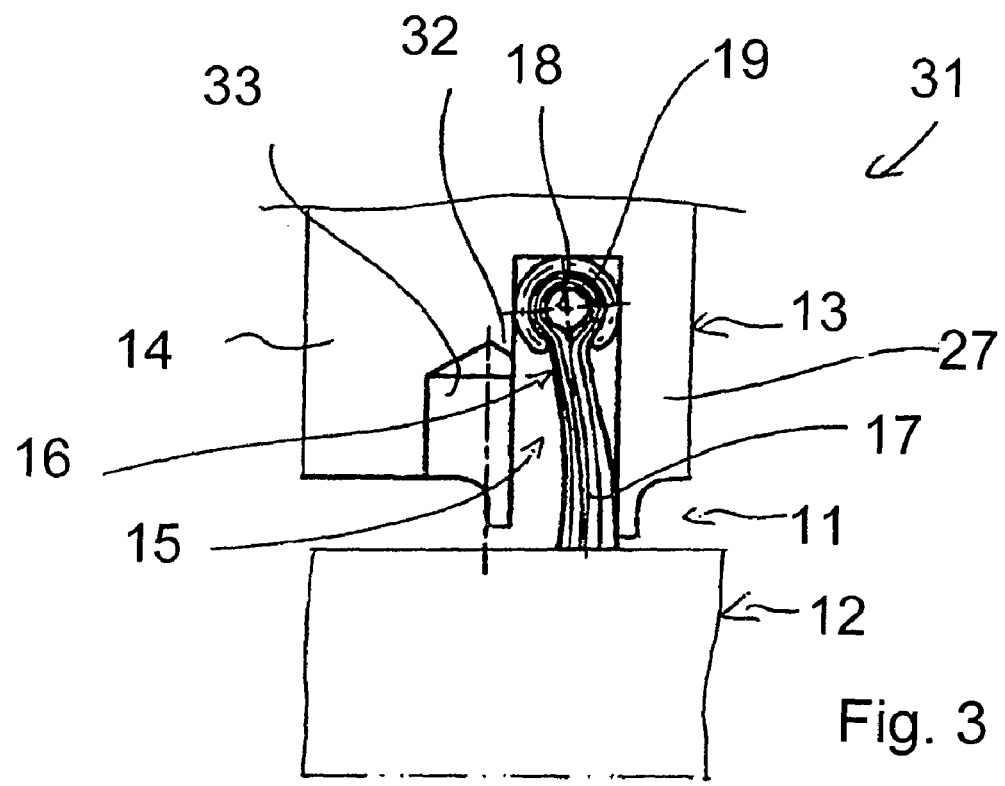
FIG. 3 shows a cross section through a seal system according to the present invention according to a third exemplary embodiment of the present invention.

FIG. 3 shows another exemplary embodiment of seal system 31 according to the present invention. Brush seal segments 16 are caulked in groove 15 by lip-shaped clamping elements 32 also in seal system 31 of FIG. 3. In the exemplary embodiment of FIG. 3, lip-shaped clamping elements 32 do not, however, run in the circumferential direction, but rather only extend into some sections over the circumference of groove 15. In the exemplary embodiment of FIG. 3, a plurality of bore holes 33, spaced apart from each other and defining lip-type clamping element sections 32, are integrated over the circumference of groove 15. As mentioned previously, bore holes 33 are spaced apart from each other over the circumference of groove 15. The groove wall opposite support element 27 is thus interrupted in some sections in such a way that a cover element provided by this groove wall is also interrupted in some sections.

Figure 5:
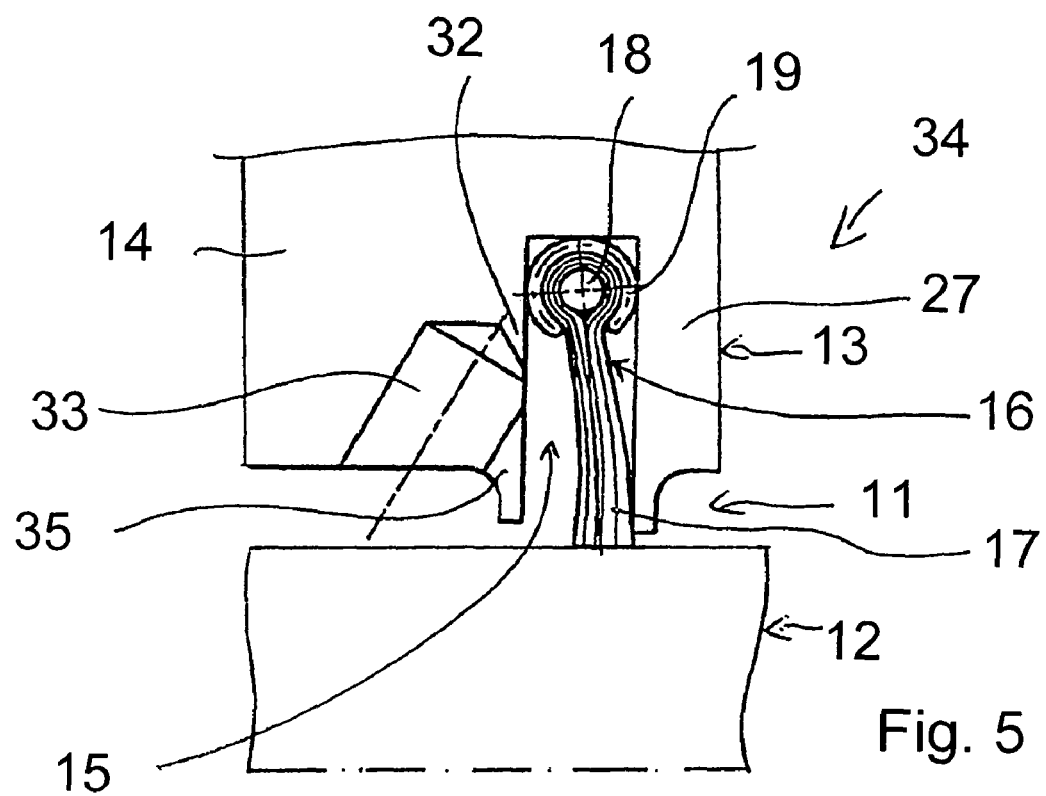
FIG. 5 shows a cross section through a seal system according to the present invention according to a fifth exemplary embodiment of the present invention.

FIG. 5 shows an exemplary embodiment of a seal system 34 according to the present invention in which bore holes 33 run obliquely for forming lip-type clamping element sections 32. This ensures that a cover element 35 situated opposite support element 27 is available over the entire circumference of groove 15. Regarding the other details, reference is made to the designs of the exemplary embodiments according to FIGS. 1 through 4.

Figure 6:
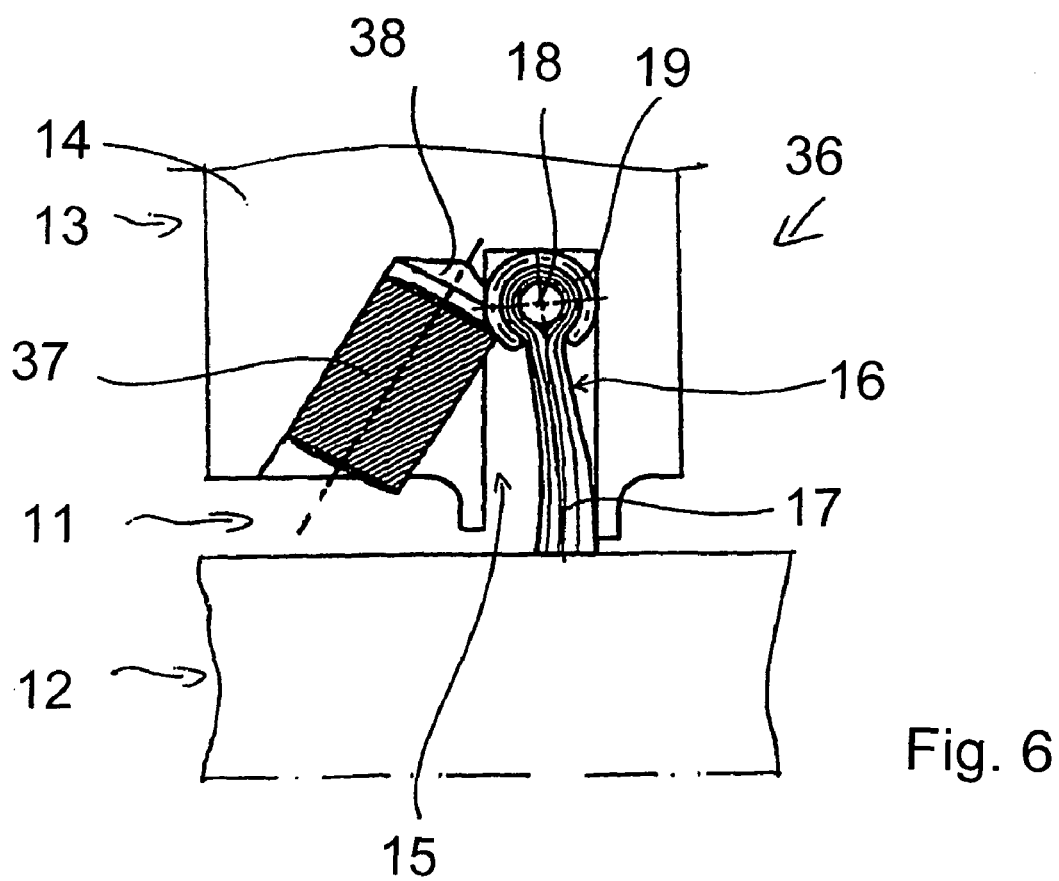
FIG. 6 shows a cross section through a seal system according to the present invention according to a sixth exemplary embodiment of the present invention.

FIG. 6 shows another exemplary embodiment of seal system 36 according to the present invention. In the exemplary embodiment of FIG. 6, brush seal segments 16 are also secured in groove 15 without undercut by clamping elements; in the exemplary embodiment of FIG. 6, clamping elements 37 have a pin-type or bolt-type design and are inserted in bore holes 38 of seal holder 14. Pin-type clamping elements 37 introduced into bore holes 38 constrict groove 15 without undercut in some sections and are responsible for positively securing brush seal segments 16 in circumferential groove 15. Clamping elements 37 may be designed as passing pins or headless screws. Clamping elements 37 may be secured in bore hole 38 by gluing or welding. If headless screws are used, the brush seal segment may be pressed, in a controlled manner, into the circumferential groove, so that they rest on the groove bottom without a gap. This allows the seal gap existing between the brush seal segments and the rotor to be adjusted in a particularly accurate manner.

Of course, similarly to the embodiment of FIG. 6, clamping elements designed as passing pins or headless screws may also be used for securing brush seal segments in the embodiment of FIG. 3, in which bore holes 33 run in a radial direction.

Figure 7:
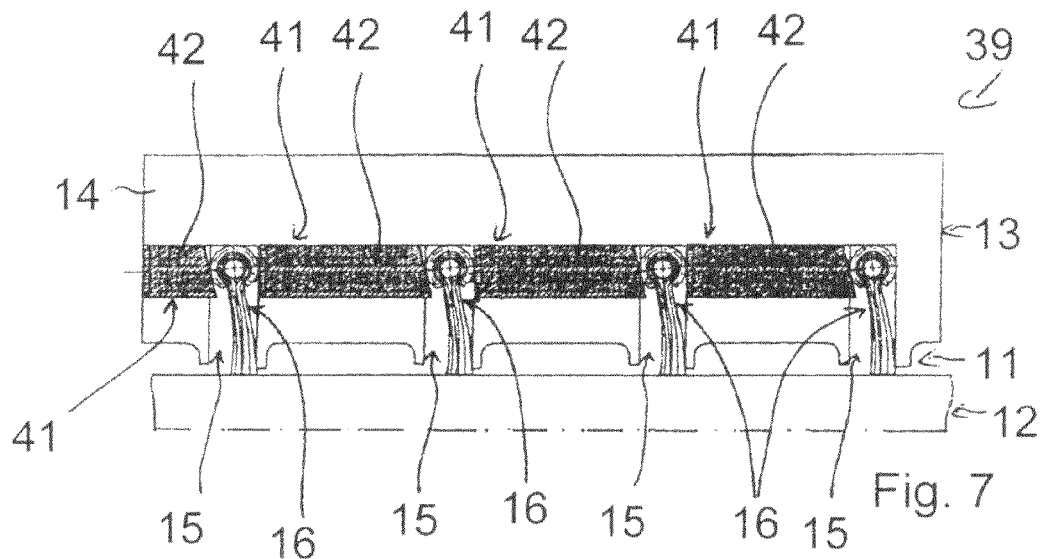
FIG. 7 shows a cross section through a seal system according to the present invention according to a seventh exemplary embodiment of the present invention.
Figure 8:
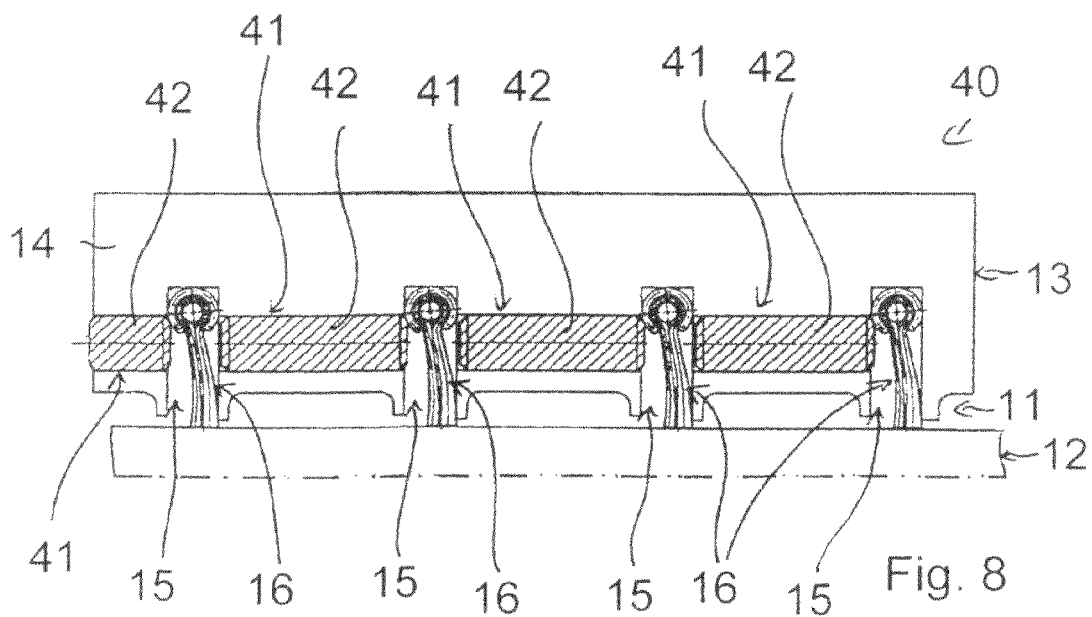
FIG. 8 shows a cross section through a seal system according to the present invention according to an eighth exemplary embodiment of the present invention.

FIGS. 7 and 8 show exemplary embodiments of dynamic seal systems 39 and 40, respectively, for sealing circumferential gap 15 between rotor 12 and stator 13, a plurality of grooves 15 spaced from each other being integrated in seal holder 14. Each circumferential groove 15 is used for receiving a plurality of brush seal segments 16. In FIGS. 7 and 8, two adjacent grooves 15 are connected by bore holes 41 extending in the axial direction, clamping elements 42 being accommodated in bore holes 41. Clamping elements 42 are designed as passing pins or headless screws and are used in turn for constricting grooves 15 without undercut for positively securing brush seal segments 16 in grooves 15 without undercut.

To assemble seal systems 39 and 40 of the exemplary embodiments according to FIGS. 7 and 8, the procedure is to first accommodate brush seal segments 16 in rightmost groove 15 and then to push a first clamping element 42 through bore holes 41 from the left to the extreme right to thus secure brush seal segments 16 in rightmost groove 15. Subsequently, brush seal segments 16 are installed in adjacent particular grooves 15 and these brush seal segments 16 are secured using clamping elements 42 until brush seal segments 16 are installed in leftmost groove 15, a clamping element 42 positively securing brush seal segments 16 also in the area of this groove. The exemplary embodiments of FIGS. 7 and 8 differ by the specific embodiment of clamping elements 42, the ends of clamping elements 42 protruding into the particular grooves 15 in the exemplary embodiment of FIG. 7 being beveled.

All seal systems of FIGS. 1 through 8 show dynamic seal systems for sealing a gap 11 between a rotor 12 and a stator 13, at least one groove 15 without undercut being installed in a seal holder 14 of stator 13 for accommodating brush seal segments 16 and 20. Brush seal segments 16 are secured by clamping elements in the or each groove 15 without undercut. The clamping elements are designed either as lip-type clamping elements or as pins, bolts, or screws inserted in bore holes.

As mentioned previously, the brush seals are composed of brush seal segments, each brush seal segment extending over a defined angular section of the circumference of the groove. It should be mentioned that, of course, seal holder 14 may also be segmented. Seal holder 14 may thus be composed of a plurality of seal holder segments, each seal holder segment extending over a defined circumferential section; one or more brush seal segments may be positioned in each seal holder segment. The seal holder segments together form the seal holder.

FIG. 9 shows a seal system 43 for sealing a gap 44 between two stator-side components 45 and 46; seal system 43 of FIG. 9 is therefore a static seal system. A groove 47 in which a brush seal or a plurality of brush seal segments 48 is accommodated is introduced in a first stator-side component 45. Brush seal segment 48 of FIG. 9 has a plurality of wire-type bristles 49, which is secured in a U-shaped bristle holder 50. Free ends of bristles 49 project from groove 47 and contact a second stator-side component 46. Bristles 49 and groove 47 extend in the axial direction according to FIG. 9.

In the exemplary embodiment of FIG. 9, groove 47 is a groove without undercut which therefore has the same radial height over its entire axial width. Within this groove 47 without undercut running axially, brush seal segments 48 are situated with a radial clearance; therefore, brush seal segments 48 may be displaced within groove 47 in the direction of double arrow 51. Brushes 49 of brush seal segments 48 extend in the axial direction and press brush seal segment 48 into groove 47.

The seal systems according to the present invention are preferably used in turbo-engines, in particular in gas turbines such as in aircraft engines. The dynamic seal systems according to FIGS. 1 through 8 are preferably used for sealing circumferential radial gaps between rotors and stators in turbines or compressors, thus, for example, for sealing a radial inner gap between a rotor and radial inner ends of stationary guide vanes or for sealing a radial outer gap between radial outer ends of rotating rotor blades and a stationary housing. The seal systems according to the present invention depicted in FIGS. 1 through 8 are used as so-called "inner air seals" or as so-called "outer air seals." The seal systems according to the present invention may also be used in steam turbines.

What is claimed is:

1. A seal system for a turbo-engine, for sealing a circumferential gap between a rotor and a stator, the stator comprising a seal holder having at least one circumferential groove for receiving a segmented dynamic seal, the segmented dynamic seal including a plurality of segments; each of the segments being brush seal segments having bristles, the bristles having free ends, the free ends of the bristles extending in a radial direction projecting from the at least one groove and resting on the rotor, the at least one groove being a groove without undercut, the brush seal segments being positively secured in the groove;
wherein the at least one groove includes a plurality of axially spaced circumferential grooves, each receiving a respective one of a plurality of brush seal segments, two adjacent grooves of the plurality of grooves being connected by at least one bore hole extending in an axial direction, the brush seal segments being positively secured in the grooves by clamping elements passing through the bore holes.

2. The seal system as recited in claim 1, wherein the groove has a uniform axial width, in at least one receptacle section for the brush seal segments, over its entire radial height.

3. The seal system as recited in claim 1, wherein the bristles of one of the brush seal segments rest axially on a radially longer side wall of the groove, the side wall of the groove forming a support element.

4. The seal system as recited in claim 1, wherein the clamping elements are pin-type or screw-type clamping elements.

5. The seal system as recited in claim 4, wherein the or each clamping element is designed as a passing pin or a headless screw.

6. The seal system as recited in claim 1, wherein the seal holder is segmented such that a plurality of seal holder segments extends over the circumference of the rotor, and together forms a circular ring-shaped seal holder.

7. A seal system for a turbo-engine for sealing a gap between two stator-side components comprising a first stator-side component and a second stator-side component, the first stator-side component having at least one groove for receiving a static seal, the static seal being designed as a brush seal having bristles, the bristles having free ends, the free ends of the bristles projecting from the groove and resting on a second stator-side component,
the groove being a groove without undercut, the brush seal being secured in the groove with a radial clearance; wherein the at least one groove includes a plurality of axially spaced circumferential grooves, each receiving a respective one of a plurality of brush seal segments, two adjacent grooves of the plurality of grooves being connected by at least one bore hole extending in an axial direction, the brush seal segments being positively secured in the grooves by clamping elements passing through the bore holes.

8. The seal system as recited in claim 7, wherein in a receptacle section for the brush seal, the groove has a uniform radial height over its entire axial width.

9. A turbo-engine having at least one seal system as recited in claim 1.

10. A gas turbine, an aircraft engine in particular, having at least one seal system as recited in claim 1.

11. A steam turbine having at least one seal system as recited in claim 1.

12. A turbo-engine having at least one seal system as recited in claim 7.

13. A gas turbine, an aircraft engine in particular, having at least one seal system as recited in claim 7.

14. A steam turbine having at least one seal system as recited in claim 7.

* * * * *